US011984081B2

(12) United States Patent
Yang

(10) Patent No.: US 11,984,081 B2
(45) Date of Patent: May 14, 2024

(54) PIXEL CIRCUIT AND METHOD OF DRIVING THE SAME, DISPLAY DEVICE

(71) Applicant: BOE TECHNOLOGY GROUP CO., LTD., Beijing (CN)

(72) Inventor: Chengchung Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/150,092

(22) Filed: Jan. 4, 2023

(65) Prior Publication Data

US 2023/0145828 A1 May 11, 2023

Related U.S. Application Data

(60) Division of application No. 17/573,987, filed on Jan. 12, 2022, now abandoned, which is a continuation of
(Continued)

(30) Foreign Application Priority Data

Aug. 25, 2017 (CN) ........................ 201710749623.2

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01)

(58) Field of Classification Search
CPC ... G09G 2300/0426; G09G 2300/0465; G09G 2300/0819; G09G 2300/0842; G09G 2300/0861; G09G 2310/0216; G09G 2310/0245; G09G 2320/0257; G09G 2320/045; G09G 3/32-3291;
(Continued)

(56) References Cited

U.S. PATENT DOCUMENTS 10,083,656 B2 * 9/2018 Na ........................ G09G 3/3233
10,650,751 B2 5/2020 Zou et al.
(Continued)

FOREIGN PATENT DOCUMENTS

CN 1744774 A 3/2006
CN 104200771 A 12/2014
(Continued)

OTHER PUBLICATIONS

U.S. Appl. No. 16/318,321 Non-Final Office Action dated Mar. 17, 2021.

(Continued)

*Primary Examiner* — Roberto W Flores
(74) *Attorney, Agent, or Firm* — The Webb Law Firm

(57) ABSTRACT

The present disclosure relates to a pixel circuit and a method of driving the same, and a display device. A pixel circuit, including: a light emitting device; a driving sub-circuit configured to drive the light emitting device, the driving sub-circuit including a driving transistor configured to generate a driving current flowing through the light emitting device so that the light emitting device emits light; and a reset sub-circuit configured to reset a voltage between a gate electrode and a second electrode of the driving transistor.

17 Claims, 15 Drawing Sheets

Related U.S. Application Data application No. 16/318,321, filed as application No. PCT/CN2018/088703 on May 28, 2018, now Pat. No. 11,244,611.

(58) Field of Classification Search

CPC ....... G09G 2300/08; G09G 2300/0809; G09G 2300/0866; G09G 2300/088–089; G09G 2310/0251; G09G 2320/043–048

See application file for complete search history.

(56) References Cited

U.S. PATENT DOCUMENTS

| | | | | |
|---|---|---|---|---|
| 10,699,640 | B2 | 6/2020 | Zhou et al. | |
| 10,902,781 | B2 | 1/2021 | Xiao et al. | |
| 2005/0052366 | A1 | 3/2005 | Kim | |
| 2006/0055336 | A1 | 3/2006 | Jeong | |
| 2010/0164847 | A1* | 7/2010 | Lee | G09G 3/3233 345/77 |
| 2012/0001893 | A1 | 1/2012 | Jeong et al. | |
| 2012/0001896 | A1 | 1/2012 | Han et al. | |
| 2015/0187270 | A1* | 7/2015 | Lee | G09G 3/3266 345/76 |
| 2015/0364083 | A1 | 12/2015 | Jeon | |
| 2016/0140904 | A1 | 5/2016 | Wu et al. | |
| 2016/0148569 | A1* | 5/2016 | Park | G09G 3/3233 345/212 |
| 2016/0260377 | A1 | 9/2016 | Hu | |
| 2016/0379552 | A1* | 12/2016 | Kim | G09G 3/3233 345/76 |
| 2017/0076671 | A1* | 3/2017 | Kim | G09G 3/3258 |
| 2018/0226026 | A1 | 8/2018 | Chen et al. | |
| 2018/0374415 | A1* | 12/2018 | Morita | H10K 59/1213 |
| 2019/0005889 | A1* | 1/2019 | Kwon | G09G 3/30 |

FOREIGN PATENT DOCUMENTS

| | | | |
|---|---|---|---|
| CN | 104269133 | A | 1/2015 |
| CN | 104616621 | A | 5/2015 |
| CN | 106297645 | A | 1/2017 |
| CN | 106448557 | A | 2/2017 |
| CN | 106531076 | A | 3/2017 |
| CN | 106652915 | A | 5/2017 |
| CN | 106981268 | A | 7/2017 |
| CN | 107358918 | A | 11/2017 |
| CN | 107452331 | A | 12/2017 |
| CN | 207134126 | U | 3/2018 |
| KR | 1020070019463 | A | 2/2007 |

OTHER PUBLICATIONS

U.S. Appl. No. 17/573,987 Non-Final Office Action dated Jul. 26, 2022.

U.S. Appl. No. 17/573,987 Notice of Non-Compliant Amendment dated Nov. 4, 2022.

EP Application No. 18830359 European Search Report and Written Opinion.

EP Application No. 18830359 Communication R70(2).

PCT/CN2018/088703 Internation Search Report and Written Opinion dated May 28, 2018.

* cited by examiner

PIXEL CIRCUIT AND METHOD OF DRIVING THE SAME, DISPLAY DEVICE

CROSS REFERENCE TO RELATED APPLICATIONS

This application is a divisional of U.S. patent application Ser. No. 17/573,987, filed on Jan. 12, 2022, which is a continuation of U.S. patent application Ser. No. 16/318,321. The U.S. patent application Ser. No. 16/318,321 is filed on Jan. 16, 2019, which is a national stage of International Application No. PCT/CN2018/088703, filed on May 28, 2018. The International Application claims priority to Chinese Patent Application No. 201710749623.2, filed on Aug. 25, 2017. All of the afore-mentioned patent applications are hereby incorporated by reference in their entireties.

FIELD

The present disclosure relates to the field of display technology, and in particular, to a pixel circuit, a method of driving the same, and a display device.

BACKGROUND

The Organic Light Emitting Diode (OLED) display is one of the hotspots in the current research field. Compared with liquid crystal displays (LCD), OLED has low energy consumption, low production cost, self-luminous, wide viewing angle, fast response speed and other advantages.

SUMMARY

According to an aspect of the present disclosure, a pixel circuit is provided, including: a light emitting device; a driving sub-circuit configured to drive the light emitting device, the driving sub-circuit including a driving transistor configured to generate a driving current flowing through the light emitting device so that the light emitting device emits light; and a reset sub-circuit configured to reset a voltage between a gate electrode and a second electrode of the driving transistor.

According to some embodiments of the present disclosure, the reset sub-circuit is connected to an initial voltage terminal and the driving sub-circuit, and the reset sub-circuit is configured to write an initial voltage of the initial voltage terminal to the gate electrode and the second electrode of the driving transistor of the driving sub-circuit.

According to some embodiments of the present disclosure, a first electrode of the driving transistor is configured to be in a float state during a process in which the reset sub-circuit resets the voltage between the gate electrode and the second electrode of the driving transistor.

According to some embodiments of the present disclosure, the pixel circuit further includes: a write sub-circuit configured to write a data voltage from a data voltage terminal to the driving sub-circuit under the control of a first scan signal terminal.

According to some embodiments of the present disclosure, the pixel circuit further includes: a compensation sub-circuit configured to compensate a threshold voltage of the driving transistor.

According to some embodiments of the present disclosure, the pixel circuit further includes: a light emission control sub-circuit configured to transmit the driving current to the light emitting device.

According to some embodiments of the present disclosure, the reset sub-circuit is configured to write the initial voltage of the initial voltage terminal to the light emitting device.

According to some embodiments of the present disclosure, a part of the reset sub-circuit is reused as at least a part of the compensation sub-circuit.

According to some embodiments of the present disclosure, the reset sub-circuit includes a first transistor and a second transistor; a gate electrode of the first transistor is connected to a second scan signal terminal, a first electrode of the first transistor is connected to the gate electrode of the driving transistor, and a second electrode of the first transistor is connected to an initial voltage terminal; a gate electrode of the second transistor is connected to a light emission control signal terminal, a first electrode of the second transistor is connected to a second electrode of the driving transistor, and a second electrode of the second transistor is connected to the gate electrode of the driving transistor.

According to some embodiments of the present disclosure, the reset sub-circuit further includes a third transistor; a gate electrode of the third transistor is connected to a second scan signal terminal, a first electrode of the third transistor is connected to the light emitting device, and a second electrode of the third transistor is connected to the initial voltage terminal.

According to some embodiments of the present disclosure, a part of the reset sub-circuit is reused as at least a part of the light emission control sub-circuit.

According to some embodiments of the present disclosure, wherein the reset sub-circuit includes a first transistor, a second transistor and a third transistor, a gate electrode of the first transistor is connected to a second scan signal terminal, a first electrode of the first transistor is connected to the gate electrode of the driving transistor, and a second electrode of the first transistor is connected to the initial voltage terminal; a gate electrode of the second transistor is connected to the second scan signal terminal, a first electrode of the second transistor is connected to the light emitting device, and a second electrode of the second transistor is connected to the initial voltage terminal; and a gate electrode of the third transistor is connected to the first scan signal terminal, a first electrode of the third transistor is connected to the second electrode of the driving transistor, and a second electrode of the third transistor is connected to the light emitting device.

According to some embodiments of the present disclosure, the compensation sub-circuit includes the second transistor.

According to some embodiments of the present disclosure, the light emission control sub-circuit includes a fourth transistor and a fifth transistor; a gate electrode of the fourth transistor is connected to the light emission control signal terminal, a first electrode of the fourth transistor is connected to the first voltage terminal, and a second electrode of the fourth transistor is connected to the first electrode of the driving transistor; and a gate electrode of the fifth transistor is connected to the light emission control signal terminal, a first electrode of the fifth transistor is connected to the second electrode of the driving transistor, and a second electrode of the fifth transistor is connected to the light emitting device.

According to some embodiments of the present disclosure, the light emission control sub-circuit includes the third transistor and the fourth transistor; the gate electrode of the fourth transistor is connected to the light emission control signal terminal, the first electrode of the fourth transistor is connected to the first voltage terminal, and the second electrode of the fourth transistor is connected to the first electrode of the driving transistor.

According to some embodiments of the present disclosure, the compensation sub-circuit includes a fifth transistor; a gate electrode of the fifth transistor is connected to the first scan signal terminal, a first electrode of the fifth transistor is connected to the second electrode of the driving transistor, and a second electrode of the fifth transistor is connected to the gate electrode of the driving transistor.

According to some embodiments of the present disclosure, the write sub-circuit includes a sixth transistor, a first electrode of the sixth transistor is connected to the first scan signal terminal, a first electrode of the sixth transistor is connected to the data voltage terminal, and a second electrode of the sixth transistor is connected to the first electrode of the driving transistor.

According to some embodiments of the present disclosure, the driving sub-circuit further includes a storage capacitor; one end of the storage capacitor is connected to the first voltage terminal and the other end of the storage capacitor is connected to the gate electrode of the driving transistor.

According to another aspect of the present disclosure, a display device is provided, including the above pixel circuit of the present disclosure.

According to some embodiments of the present disclosure, the display device includes a display panel on which sub-pixels arranged in a matrix are disposed, the pixel circuits being arranged in the sub-pixels; except the first row of sub-pixels, the second scan signal terminals of the pixel circuits in the next row of sub-pixels are connected to the first scan signal terminals of the pixel circuits in the previous row of sub-pixels.

According to another aspect of the present disclosure, a method for driving the pixel circuit according to the present disclosure, comprising: setting the first electrode of the driving transistor to a float state, and writing, by the reset sub-circuit, an initial voltage of the initial voltage terminal to the gate electrode and the second electrode of the driving transistor in the driving sub-circuit; writing, by the writing sub-circuit, a data voltage of the data voltage terminal to the driving sub-circuit according to a control signal provided by the first scan signal terminal; generating, by the d iving sub-circuit, a driving current according to the first voltage terminal, the second voltage terminal, and the data voltage written to the driving sub-circuit; and emitting light by the light emitting device according to the driving current.

According to some embodiments of the present disclosure, the method further includes: compensating, by the compensation sub-circuit, a threshold voltage of the driving transistor in the driving sub-circuit.

According to some embodiments of the present disclosure, the reset sub-circuit is connected to the second scan signal terminal and the light emission control signal terminal; the reset sub-circuit includes a first transistor and a second transistor, wherein a gate electrode of the first transistor is connected to the second scan signal terminal, a first electrode of the first transistor is connected to the gate electrode of the driving transistor, and a second electrode of the first transistor is connected to the initial voltage terminal; a gate electrode of the second transistor is connected to the light emission control signal terminal, a first electrode of the second transistor is connected to a second electrode of the driving transistor, a second electrode of the second transistor is connected to the gate electrode of the driving transistor, and the driving transistor is a P-type transistor, the step of setting the first electrode of the driving transistor to a float state and writing, by the reset sub-circuit, an initial voltage of the initial voltage terminal to the gate electrode and the second electrode of the driving transistor in the driving sub-circuit includes: setting the first electrode of the driving transistor to a float state; providing a signal of the second scan signal terminal to the gate electrode of the first transistor of the reset sub-circuit so that the first transistor is turned on; providing an initial voltage of the initial voltage terminal to the first electrode of the first transistor so that the initial voltage of the initial voltage terminal is written to the gate electrode of the driving transistor; and providing a signal of the light emission control signal terminal to the gate electrode of the second transistor of the reset sub-circuit, so that the second transistor is turned on, the gate electrode of the driving transistor is electrically connected to the second electrode of the driving transistor through the first electrode of the second transistor and the second electrode of the second transistor.

According to some embodiments of the present disclosure, the reset sub-circuit is connected to the first scan signal terminal, the second scan signal terminal, and the anode of the light emitting device; the reset sub-circuit comprises a first transistor, a second transistor and a third transistor, wherein a gate electrode of the first transistor is connected to the second scan signal terminal, a first electrode of the first transistor is connected to the gate electrode of the driving transistor, and a second electrode of the first transistor is connected to the initial voltage terminal; a gate electrode of the second transistor is connected to the second scan signal terminal, a first electrode of the second transistor is connected to the anode of the light emitting device, and a second electrode of the second transistor is connected to the initial voltage terminal; a gate electrode of the third transistor is connected to the first scan signal terminal, a first electrode of the third transistor is connected to a second electrode of the driving transistor, a second electrode of the third transistor is connected to the anode of the light emitting device, wherein the driving transistor is a P-type transistor, the step of setting the first electrode of the driving transistor to a float state and writing, by the reset sub-circuit, an initial voltage of the initial voltage terminal to the gate electrode and the second electrode of the driving transistor in the driving sub-circuit includes: setting the first electrode of the driving transistor to a float state; providing a signal of the second scan signal terminal to the gate electrode of the first transistor of the reset sub-circuit and the gate electrode of the second transistor of the reset sub-circuit so that both of the first transistor and the second transistor are turned on; providing a signal of the first scan signal terminal to the gate electrode of the third transistor of the reset sub-circuit so that the third transistor is turned on; writing the initial voltage of the initial voltage terminal to the gate electrode of the driving transistor through the first transistor; writing the initial voltage of the initial voltage terminal to the light emitting device through the second transistor; and writing the initial voltage of the initial voltage terminal to the second electrode of the driving transistor through the second transistor and the third transistor.

DESCRIPTION OF THE DRAWINGS

In order to more clearly explain the embodiments of the present invention or the technical solutions in the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION OF PREFERRED EMBODIMENTS

Below, a clear and complete description will be given for the technical solution of embodiments of the present disclosure with reference to the figures of the embodiments. Obviously, merely some embodiments of the present disclosure, rather than all embodiments thereof, are given herein. All other embodiments obtained by those of ordinary skill in the art based on the embodiments of the present disclosure without creative efforts shall fall within the protection scope of the present disclosure.

Figure 1A:
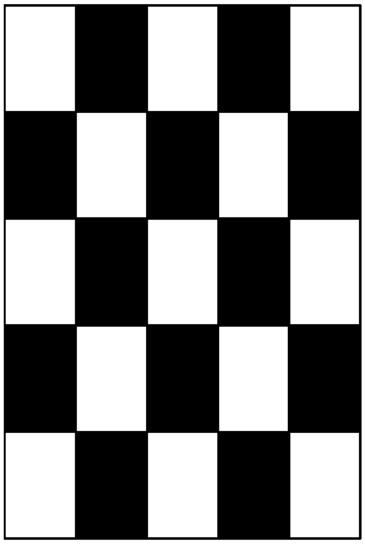
FIG. 1*a* is a displayed image according to the prior art.
Figure 1B:
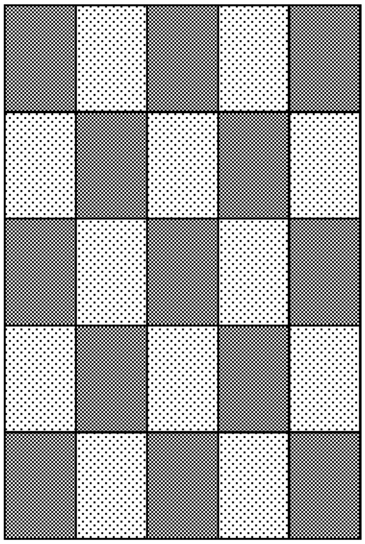
FIG. 1*b* is a schematic diagram showing a short-term afterimage of the displayed image in the prior art.
Figure 1C:
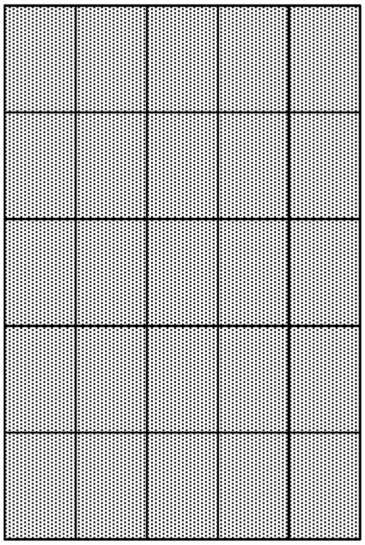
FIG. 1*c* is another displayed image according to the prior art.

At present, when an OLED display switches between pictures of different gray-scales, for example, from a picture of black-and-white blocks shown in FIG. 1*a* to a pure gray-scale picture having a gray-scale value of 128, a short-term afterimage will occur and an image shown in FIG. 1B will be displayed, on which an afterimage of the previous frame of black-and-white blocks occurs. The above-mentioned short-term afterimage disappears after one minute, and the display shows a pure gray-scale picture having a gray-scale value of 128 as shown in FIG. 1*c*. The above-mentioned short-term afterimage has an impact on the display effect.

Embodiments of the present disclosure provide a pixel circuit, a method of driving the same, and a display device. A reset sub-circuit in the pixel circuit can set a DTFT to an OFF-Bias state at the end of a reset stage. At this point, when the DTFT in a pixel circuit of each sub-pixel of the display panel is in the OFF-Bias state during the reset stage, a gate-source voltage Vgs of DTFTs in different sub-pixels is at the bottom of the characteristic curve, with the same corresponding current Ids, which is very small. Therefore, when a next image frame is displayed, the brightness of each sub-pixel needs to be increased, i.e., the current Ids of the DTFT in each sub-pixel needs to be increased, so that hole trapping is needed at the interface between the semiconductor layer and the gate insulating layer of the DTFT in each sub-pixel. The hole trapping paths are the same for the DTFTs, thereby solving the above-mentioned problem of short-term afterimage.

According to some embodiments of the present disclosure, there is provided a pixel circuit including a reset sub-circuit 10, a driving sub-circuit 20, a write sub-circuit 30, a compensation sub-circuit 40, a light emission control sub-circuit 50, and a light emitting device L.

Figure 3:
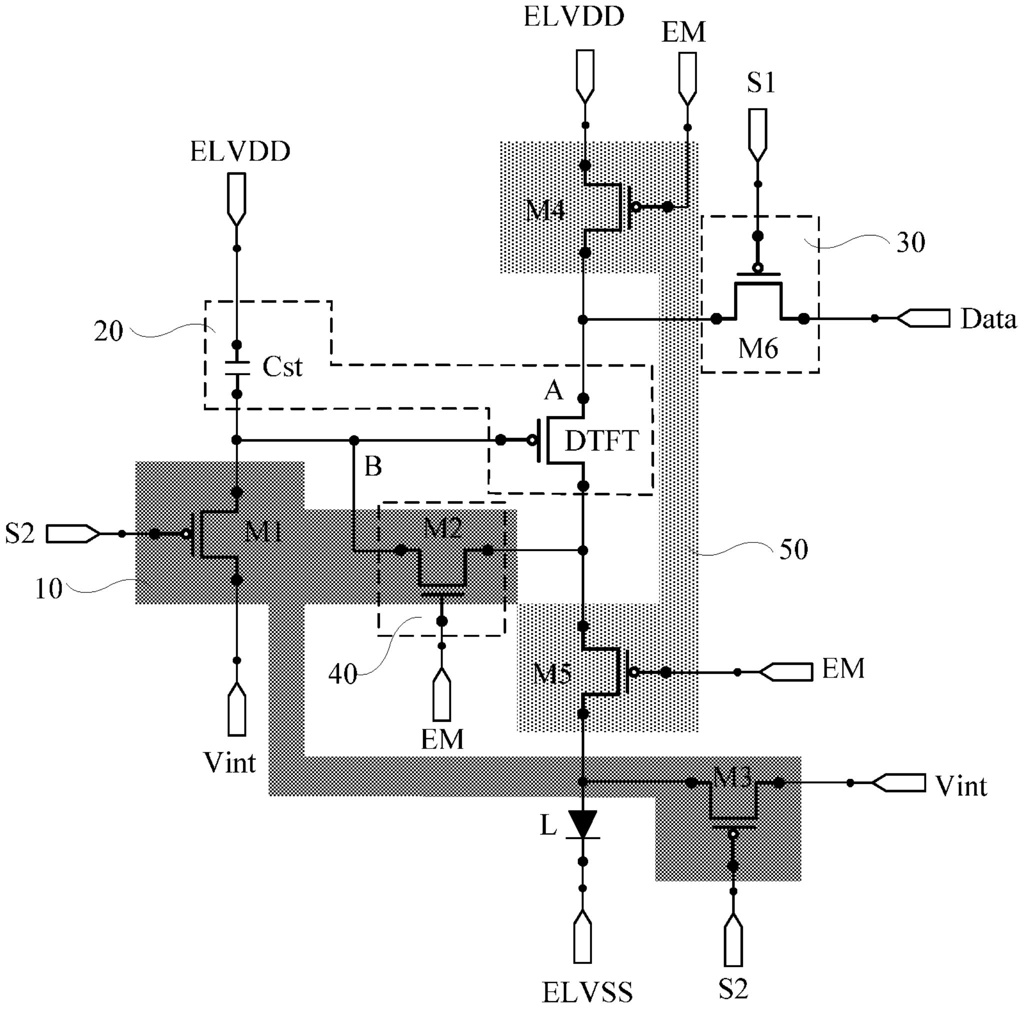
FIG. 3 is a schematic diagram of an arrangement of the reset sub-circuit in FIG. 2.

As shown in FIG. 3, the above described driving sub-circuit 20 includes a drive transistor (hereinafter referred to as DTFT), a first electrode of which is connected to the write sub-circuit 30.

Further, the driving sub-circuit 20 is further connected to a first voltage terminal ELVDD. In this case, the driving sub-circuit 20 further includes a storage capacitor Cst. One end of the storage capacitor Cst is connected to the first voltage terminal ELVDD and the other end of the storage capacitor Cst is connected to a gate electrode of DTFT. In this way, the storage capacitor Cst can ensure the stability of a gate voltage Vg of DTFT.

The connection between the various sub-circuits will be described below.

Figure 2:
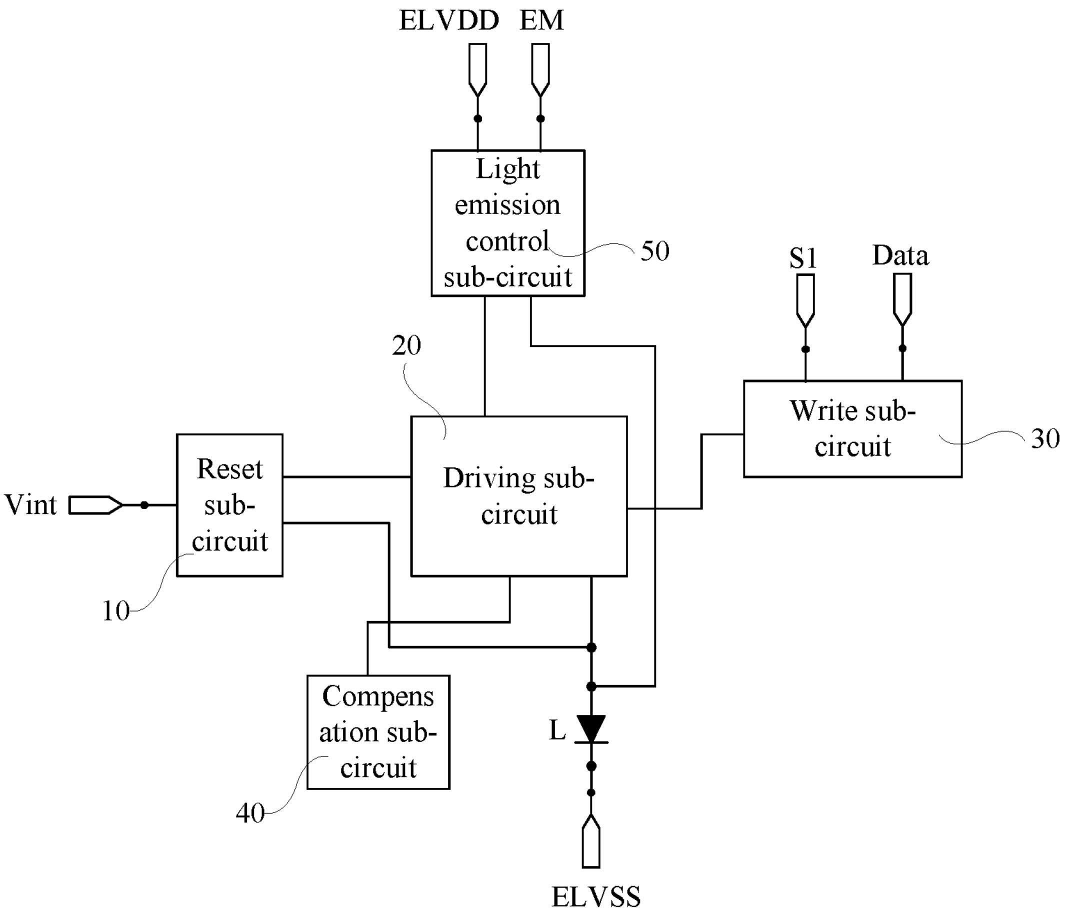
FIG. 2 is a schematic structural diagram of a pixel circuit according to an embodiment of the present disclosure.

Specifically, as shown in FIG. 2, the reset sub-circuit 10 is connected to an initial voltage terminal Vint and the driving sub-circuit 20. The reset sub-circuit 10 is configured to write an initial voltage of the initial voltage terminal Vint to a gate electrode and a second of the DTFT of the driving sub-circuit 20, a first electrode of the DTFT being in a float state during a reset stage.

It should be noted that the type of DTFT is not limited in this application and can be either an N-type transistor or a P-type transistor. The first electrode of the DTFT is one of a source electrode and a drain electrode, the second electrode of the DTFT is the other of the source electrode and the drain electrode. Below, an example will be given in which the DTFT is a P-type enhancement transistor. In this case, the first electrode of the DTFT is a source electrode and the second electrode is a drain electrode.

On this basis, when the initial voltage of the initial voltage terminal Vint is written to the gate electrode of the DTFT, since the initial voltage terminal Vint is usually at a low level, the DTFT is turned on, and in a case that the initial voltage of the initial voltage terminal Vint is written to the drain electrode of the DTFT, the gate voltage Vg of the DTFT is equal to the drain voltage Vd, i.e., Vg=Vd=Vint. The initial voltage terminal Vint resets the gate electrode of the DTFT until the source voltage Vs of DTFT is Vs=Vint−Vth. Because when Vs=Vint−Vth, the gate-source voltage Vgs of the DTFT is Vgs=Vg−Vs=Vinit−(Vinit−Vth)=Vth, the DTFT is in an OFF-Bias state. Wherein, for a P-type enhancement transistor, the turn-off condition is Vgs≥Vth and Vth is a negative value.

Figure 1D:
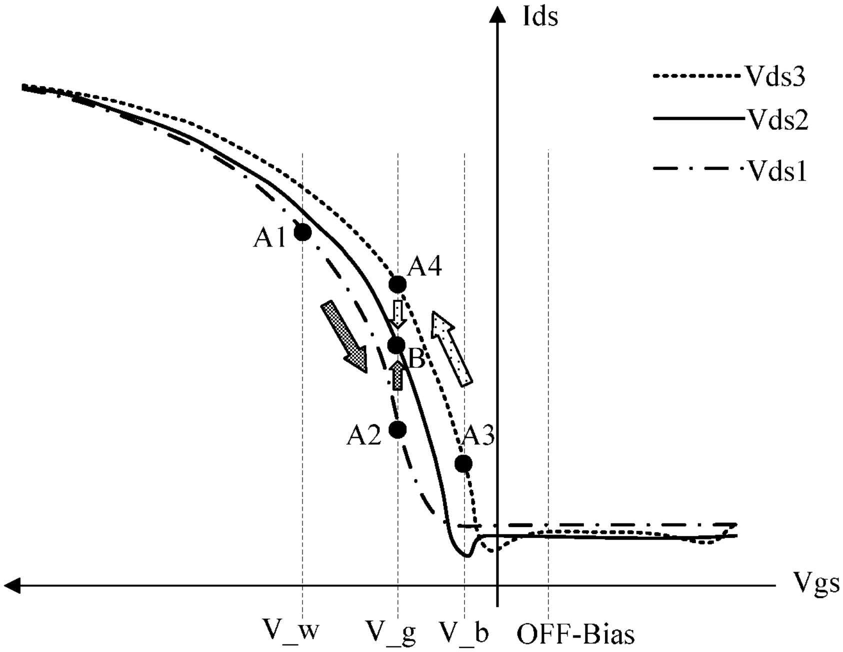
FIG. 1*d* is a diagram showing the principle of generating a short-term afterimage in the prior art.

Analysis shows that the short-term afterimage phenomenon is related to the magnetic hysteresis effect of the drive thin film transistor (DTFT) in OLED displays. The process of the magnetic hysteresis effect is shown in FIG. 1*d*, wherein the dot dash line in FIG. 1 is a characteristic curve of DTFT current Ids and Vgs when the source-drain voltage of the DTFT in a sub-pixel displaying a white picture of the OLED display is Vds1. The dotted line is a characteristic curve of DTFT current Ids and Vgs when the source-drain voltage of the DTFT in a sub-pixel displaying a black picture is Vds3. The solid line is a characteristic curve of DTFT current and Vgs when the source-drain voltage of the DTFT in a sub-pixel displaying a gray scale picture of a gray-scale value of 128 is Vds2.

As can be seen from FIG. 1B, when the white picture is switched to the gray-scale picture, the brightness of the sub-pixel displaying the white picture needs to be reduced, and the current Ids of the DTFT in the sub-pixel needs to be reduced, so that hole detrapping, from A1 to A2, is needed at the interface between the semiconductor layer and the gate insulating layer of the DTFT in the sub-pixel. At that point, the Vgs value changes from V_w to V_g. When the black picture is switched to the gray-scale picture, the brightness of the sub-pixel displaying the black picture needs to be increased, and the current Ids of the DTFT in the sub-pixel needs to be increased, so that hole trapping, from A3 to A4, is needed at the interface between the semiconductor layer and the gate insulating layer of the DTFT in the sub-pixel. At that point, the Vgs value changes from V_b to V_g. It can be seen that due to the different paths of voltage change during hole trapping and hole detrapping, points a2 and a4 which are reached to voltage V-g along different paths corresponds to different currents Ids values, so that there is a brightness difference between a sub-pixel switching from the white picture to the gray-scale picture and a sub-pixel switching from the black picture to the gray-scale picture, resulting in a short-term afterimage phenomenon as shown in FIG. 1*c*. After a period of time, both of the above points A2 and A4 reach point B, and the afterimage disappears.

On this basis, in the pixel circuit of each sub-pixel circuit of the display panel, if the DTFTs are all in the OFF-Bias state during the reset stage, as shown in FIG. 1*d*, the gate-source voltages Vgs of DTFTs of different sub-pixels are all at the bottom of the characteristic curve, with the same corresponding current Ids, which is very small. Therefore, when a next image frame is displayed, the brightness of each sub-pixel needs to be increased, i.e. the current Ids of the DTFT in each sub-pixel needs to be increased, so that hole trapping is needed at the interface between the semiconductor layer and the gate insulating layer of the DTFT in each sub-pixel, and Ids moves from A3 to A4. The hole trapping paths are the same for the various DTFTs, thereby solving the above-mentioned problem of short-term afterimage. In addition, since the pixel circuit provided by the present disclosure can solve the problem of short-term afterimage, and taking the display refresh rate required to display pictures by the display panel into account, there is no need to maintain the displayed image still.

In some embodiments according to the present disclosure, as shown in FIG. 2, the reset sub-circuit 10 is further connected to the anode of the light emitting device L. The reset sub-circuit 10 is configured to write an initial voltage of the initial voltage terminal Vint to the anode of the light emitting device L. In this way, it is possible to prevent a voltage of the previous image frame remaining on the anode of the light emitting device L from affecting the image displayed in the next image frame. For example, in a case of not resetting the anode of the light emitting device L by the reset sub-circuit 10, the voltage remaining on the anode of the light emitting device L will cause the driving current $I_{OLED}$ flowing through the light emitting device L to increase when the image of the next image frame is displayed, resulting in the brightness of the sub-pixel being larger than expected, which will reduce the contrast of the displayed image.

The cathode of the light emitting device L is connected to a second voltage terminal ELVSS. The light emitting device L may be a light emitting diode (LED) or an organic light emitting diode (OLED), which is not limited in the present disclosure.

In addition, the write sub-circuit 30 is connected to a first scan signal terminal S1, a data voltage terminal Data, and the driving sub-circuit 20. The write sub-circuit 30 is configured to write a data voltage (Vdata) of the data voltage terminal Data to the driving sub-circuit 20 under the control of the first scan signal terminal S1. Therefore, the magnitude of the driving current $I_{OLED}$ generated by the driving sub-circuit 20 for driving the light emitting device L to emit light can be matched with the above data voltage.

The compensation sub-circuit 40 is connected to the driving sub-circuit 20. This compensation sub-circuit 40 is configured to compensate a threshold voltage Vth of the DTFT in the driving sub-circuit 20.

The light emission control sub-circuit 50 is connected to the light emission control signal terminal EM, the first voltage terminal ELVDD, the driving sub-circuit 20, and the anode of the light emitting device L. The light emission control sub-circuit 50 is configured to, under the control of the light emission control signal terminal EM, transmit a driving current $I_{OLED}$ generated by the driving sub-circuit 20 under the action of the first voltage terminal ELVDD, the second voltage terminal ELVSS and the data voltage (Vdata) written to the driving sub-circuit 20 to the light emitting device L. The light emitting device L is configured to emit light according to the driving current $I_{OLED}$.

To sum up, regardless of the data voltage of the previous image frame, data writing and threshold voltage compensation are performed for the DTFTs in the various sub-pixels in the same state, that is, the OFF-Bias state, thereby the short-term afterimage problem caused by magnetic hysteresis effect can be avoided.

It should be noted that in the embodiment of the present disclosure, the first voltage terminal ELVDD is configured to output a constant high level. The second voltage terminal ELVSS is configured to output a constant low level, for example, the second voltage terminal ELVSS may be connected to a ground terminal. Moreover, terms "high" and "low" used herein only indicate the relative magnitude relationship between the input voltages.

Below, the arrangement of the reset sub-circuit 10 will be described in detail.

For example, a part of the reset sub-circuit 10 is reused as at least a part of the compensation sub-circuit 40 described above.

Specifically, as shown in FIG. 3, in the case where the reset sub-circuit 10 is still connected to the second scan signal terminal S2, the light emission control signal terminal EM, and the anode of the light emitting device L, the reset sub-circuit 10 includes a first transistor M1 and a second transistor M2.

A gate electrode of the first transistor M1 is connected to the second scan signal terminal S2, a first electrode of the first transistor M1 is connected to the gate electrode of the DTFT, and a second electrode of the first transistor M1 is connected to the initial voltage terminal Vint;

A gate electrode of the second transistor M2 is connected to the light emission control signal terminal EM, a first electrode of the second transistor M2 is connected to a second electrode of the DTFT, and a second electrode of the second transistor M2 is connected to the gate electrode of the DTFT.

In some embodiments according to the present disclosure, in the case where the reset sub-circuit 10 is connected to the anode of the light emitting device L, the reset sub-circuit 10 further includes a third transistor M3. A gate electrode of the third transistor M3 is connected to the second scan signal terminal S2, a first electrode of the third transistor M3 is connected to the anode of the light emitting device L, and a second electrode of the third transistor M3 is connected to the initial voltage terminal Vint.

On this basis, in the case where a part of the reset sub-circuit 10 is reused as at least a part of the compensation sub-circuit 40, as shown in FIG. 3, the compensation sub-circuit 40 is connected to the light emission control signal terminal EM, and the compensation sub-circuit 40 includes the second transistor M2 described above. Therefore, the reset sub-circuit 10 and the compensation sub-circuit 40 share the second transistor M2.

In addition, the light emission control sub-circuit 50 includes a fourth transistor M4 and a fifth transistor M5.

Wherein, a gate electrode of the fourth transistor M4 is connected to the light emission control signal terminal EM, a first electrode of the fourth transistor M4 is connected to the first voltage terminal ELVDD, and a second electrode of the fourth transistor M4 is connected to the first electrode of the DTFT.

A gate electrode of the fifth transistor M5 is connected to the light emission control signal terminal EM, a first electrode of the fifth transistor M5 is connected to the second electrode of the DTFT, and a second electrode of the fifth transistor M5 is connected to the anode of the light emitting device L.

In addition, the write sub-circuit 30 includes a sixth transistor M6, a gate electrode of the sixth transistor M6 is connected to the first scan signal terminal S1, a first electrode of the sixth transistor M6 is connected to the data voltage terminal Data, and a second electrode of the sixth transistor M6 is connected to the first electrode of the DTFT.

It should be noted that, in the structure shown in FIG. 3, the second transistor M2 is an N-type transistor and the other transistors are P-type transistors. Alternatively, the second transistor M2 may be a P-type transistor and the other transistors are N-type transistors. In this case, for the P-type transistor, the first electrode is a source electrode and the second electrode is a drain electrode; for the N-type transistor, the first electrode is a drain electrode and the second electrode is a source electrode.

In addition, each of the transistors described above may be an enhancement transistor or a depletion transistor.

Below, the operation of the pixel circuit shown in FIG. 3 in an image frame will be described in detail with reference to the timing diagrams of the respective signal terminals shown in FIGS. 4*a*, 5*a* and 6*a*. In the following embodiment, the second transistor M2 is an N-type transistor, the other transistors are P-type transistors, and each of the transistor is an enhancement transistor, as an example. The image frame described above includes a reset stage P1, a write compensation stage P2, and a light emission stage P3.

Figure 4A:
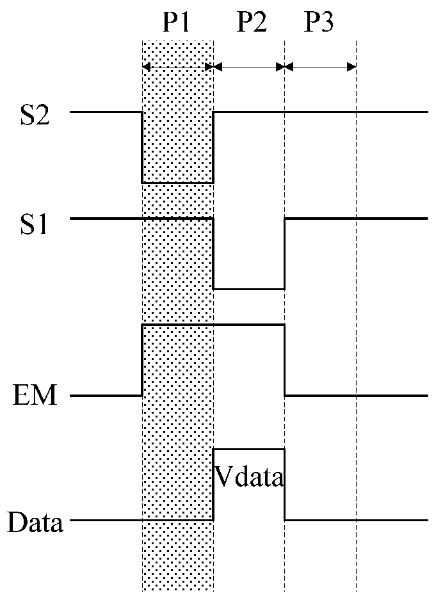
FIG. 4*a* is a timing signal diagram of various driving signals for controlling the pixel circuit shown in FIG. 3.

Specifically, in the reset stage P1 of an image frame, as shown in FIG. 4*a*, S2=0, S1=1, EM=1, Data=0; In the embodiment of the present disclosure, "0" indicates a low level and "1" indicates a high level.

Figure 4B:
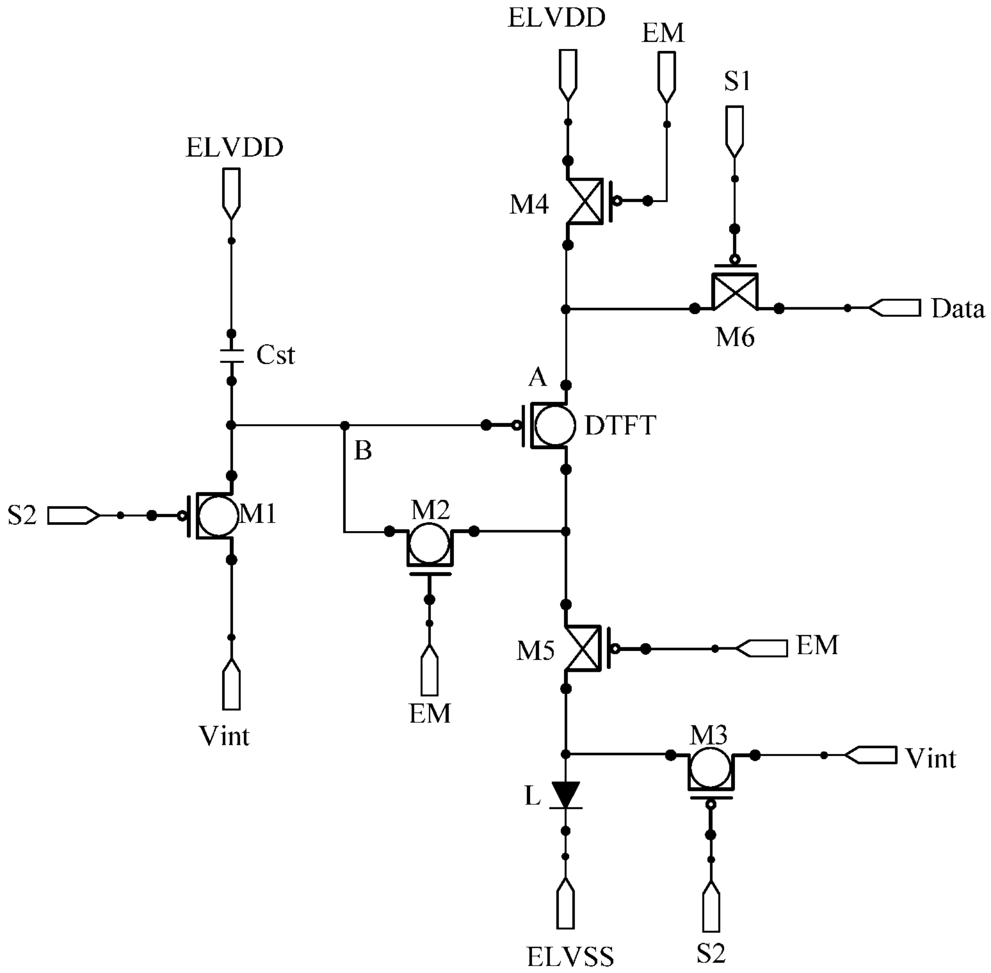
FIG. 4*b* shows on/off conditions of the various transistors in the pixel circuit of FIG. 3 in a reset stage of FIG. 4*a;*

In this case, as shown in FIG. 4*b*, since the second scan signal terminal S2 outputs a low level, the first transistor M1 is turned on, and the initial voltage of the initial voltage terminal Vint is output to the gate electrode of the DTFT through the first transistor M1. At that point, the gate voltage Vg of the DTFT is $Vg=V_B=Vint$, $V_B$ is the voltage at point B in FIG. 4*b*.

Since the second transistor M2 is an N-type transistor, under the control of the high level output from the light emission control signal terminal EM, the second transistor M2 is turned on and the gate electrode of the DTFT is electrically connected to the drain electrode (i.e., the second electrode) of the DTFT. At that point, the drain voltage Vd of the DTFT is Vd=Vint.

In this case, at the beginning of the reset stage P1, DTFT is turned on by the initial voltage terminal Vint, and the gate-source voltage of the DTFT Vgs<Vth at this time. In addition, the source electrode (i.e., the first electrode) of the DTFT is in a float state during the reset stage P1. The initial voltage terminal Vint resets the gate electrode of the DTFT until the source voltage Vs of the DTFT is $Vs=V_A=Vint-Vth$, and the reset stage ends. Because when the voltage $V_A$ at point A is Vint−Vth, the gate-source voltage Vgs of the DTFT is Vgs=Vg−Vs=Vinit−(Vinit−Vth)=Vth, at that point the DTFT is in the OFF-Bias state. Wherein, for the P-type enhancement transistor, the cutoff condition is Vgs≥Vth and Vth is negative. In this way, after the pixel circuits of the various sub-pixels are subjected to the above reset stage P1, all the DTFTs in the sub-pixels are in the same OFF-Bias state.

In addition, under the control of the second scan signal terminal S2, the third transistor M3 is turned on, so that the initial voltage of the initial voltage terminal Vint is output to the anode of the light emitting device L through the third transistor M3, and the anode of the light emitting transistor L is reset to improve the contrast of the displayed image.

In addition, the fourth transistor M4, the fifth transistor M5, and the sixth transistor M6 are turned off.

Figure 5A:
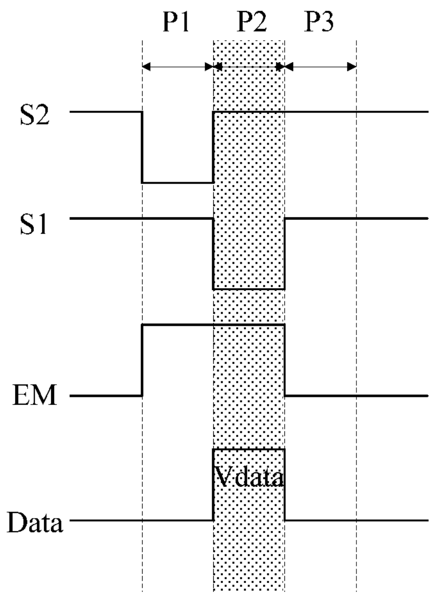
FIG. 5*a* is another timing signal diagram of the various driving signals for controlling the pixel circuit shown in FIG. 3.

In the write compensation stage P2 of an image frame, S2=1, S1=0, EM=1, Data=Vdata, as shown in FIG. 5*a*.

Figure 5B:
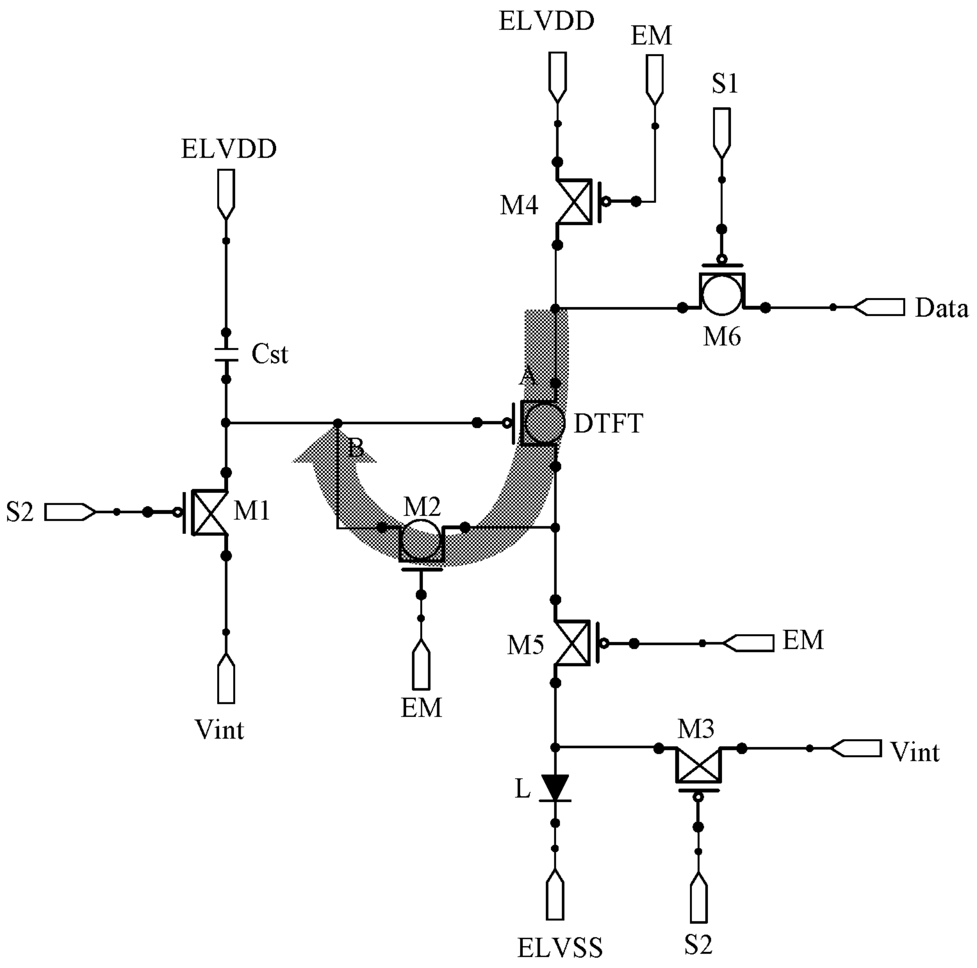
FIG. 5*b* shows on/off conditions of the various transistors in the pixel circuit of FIG. 3 in a writing compensation stage of FIG. 5*a;*

In this case, as shown in FIG. 5*b*, under the control of the first scan signal terminal S1, the sixth transistor M6 is turned on, thereby writing the data voltage Vdata output from the data voltage terminal Data to the source electrode of the DTFT through the sixth transistor M6. At that point, the source voltage Vs of the DTFT is $Vs=V_A=Vdata$, thus realizing the writing of the data voltage.

On this basis, the source electrode of the DTFT is no longer in the float state, node B can be kept at a low level by the storage capacitor Cst, and at that point DTFT is turned on. On this basis, under the control of the light emission control signal terminal EM, the second transistor M2 remains in the ON state. In this case, the gate voltage Vg of the DTFT is the same as the drain voltage Vd, i.e., Vg=Vd. At that point, Vgd=Vg−Vd=0>Vth and Vth is negative. Therefore, the DTFT is in a saturated state.

In this case, the data voltage Vdata at the data voltage terminal Data charges the storage capacitor Cst through the sixth transistor M6, the DTFT and the second transistor M2, the storage capacitor Cst in turn charges the gate electrode (i.e., point B) of the DTFT, until the voltage at point B reaches Vdata+Vth. Because when $V_B$=Vdata+Vth, the gate-source voltage Vgs of the DTFT is Vgs=Vg−Vs=Vdata+Vth−Vdata=Vth, at this time the DTFT is in the OFF-Bias state. Wherein, for the P-type enhancement transistor, the cutoff condition is Vgs≥Vth and Vth is negative. In this way, the threshold voltage Vth of the DTFT is locked to the gate electrode of the DTFT, thereby realizing compensation of the threshold voltage Vth of the DTFT.

In addition, the first transistor M1, the third transistor M3, the fourth transistor M4, and the fifth transistor M5 are in the OFF state.

Figure 6A:
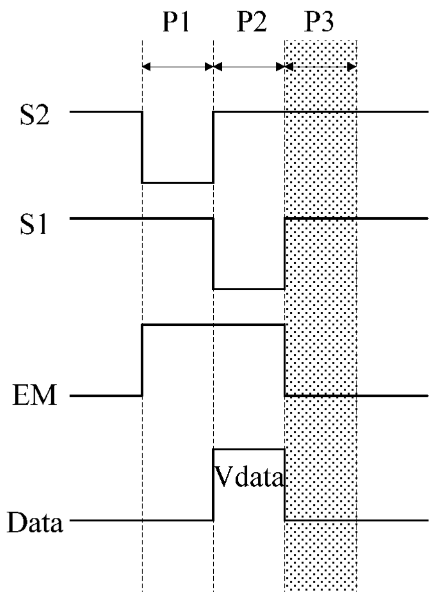
FIG. 6*a* is still another timing signal diagram of the various driving signals for controlling the pixel circuit shown in FIG. 3.

In the light emitting stage P3 of an image frame, S2=1, S1=1, EM=0, Data=0, as shown in FIG. 6*a*.

Figure 6B:
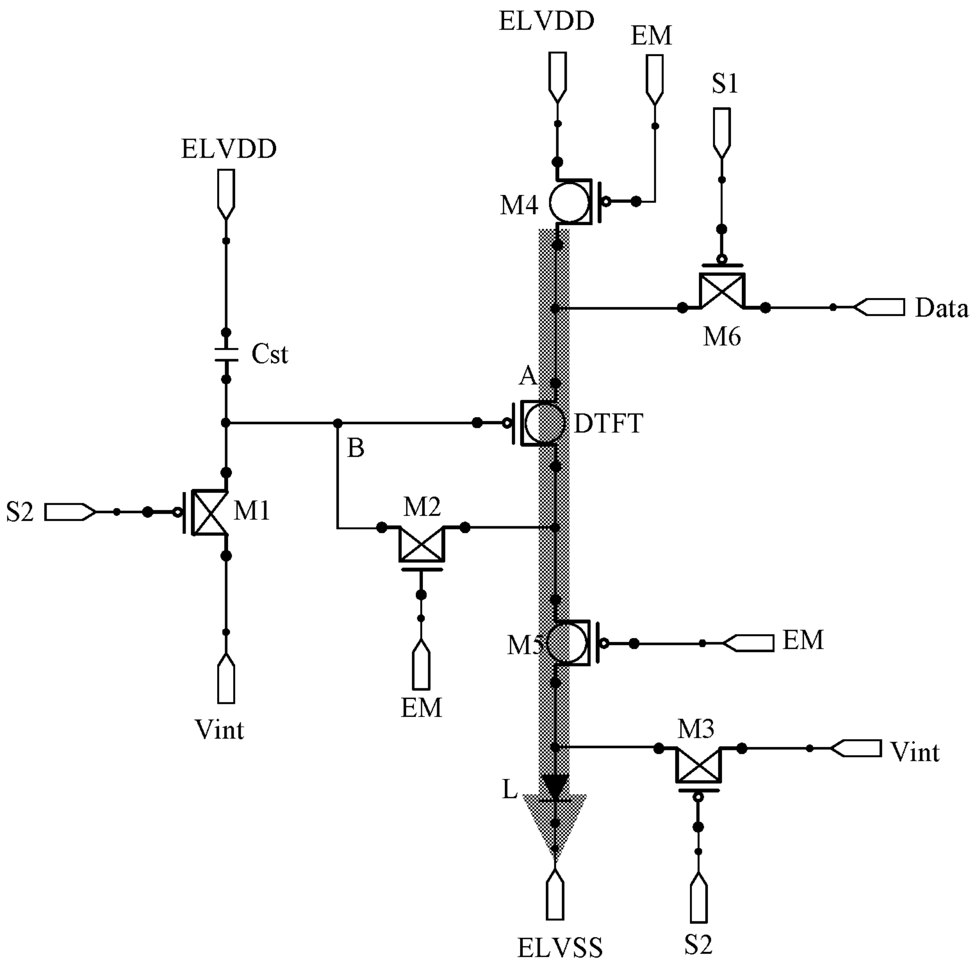
FIG. 6*b* shows on/off conditions of the various transistors in the pixel circuit of FIG. 3 in a light emitting stage of FIG. 6*a;*

In this case, as shown in FIG. 6*b*, the light emission control signal terminal EM outputs a low level, and the fourth transistor M4 and the fifth transistor M5 are turned on. At this time, the voltage $V_A$ at point A is $V_A$=ELVDD. Under the action of the storage capacitor Cst, the voltage at point B remains $V_B$=Vdata+Vth. At this time, the gate-source voltage Vgs of the DTFT is Vgs=Vg−Vs=$V_B$−$V_A$=(Vdata+Vth)−ELVDD=Vdata+Vth−ELVDD<Vth, and Vth is negative. Therefore, the DTFT is turned on.

In addition, the first transistor M1, the second transistor M2, the third transistor M3, and the sixth transistor M6 are in the OFF state.

On this basis, the driving current $I_{OLED}$ flowing through the light emitting device L is:

$$I_{OLED} = K/2 \times (Vgs - Vth)^2 = K/2 \times (Vdata + Vth - ELVDD - Vth)^2 = K/2 \times (Vdata - ELVDD)^2 \quad (1)$$

Where, k is a current constant associated with the DTFT and is related to process parameters and geometric dimensions of the DTFT, such as electron mobility μ, capacitance per unit area $C_{ox}$, aspect ratio W/L, etc.

In the prior art, the threshold voltage Vth drifts for DTFTs of different pixel units, resulting in different threshold voltages Vth of the various DTFTs. From the above formula (1), it can be seen that the driving current $I_{OLED}$ for driving the light emitting device L to emit light is independent of the threshold voltage Vth of the DTFT, thereby eliminating the influence of the threshold voltage Vth of the DTFT on the light emitting brightness of the light emitting device L, and improving the uniformity of the brightness of the light emitting device L.

It should be noted that the above is described with an example in which the second transistor M2 is an N-type transistor and the other transistors are P-type transistors. If the second transistor M2 is a P-type transistor and the other transistors are N-type transistors, the control process is similar, but some control signals need to be inverted.

In addition, in some embodiments according to the present disclosure, the above reset sub-circuit 10 is arranged in such a way that, for example, a part of the reset sub-circuit 10 is reused as at least a part of the light emission control sub-circuit 50.

Figure 7:
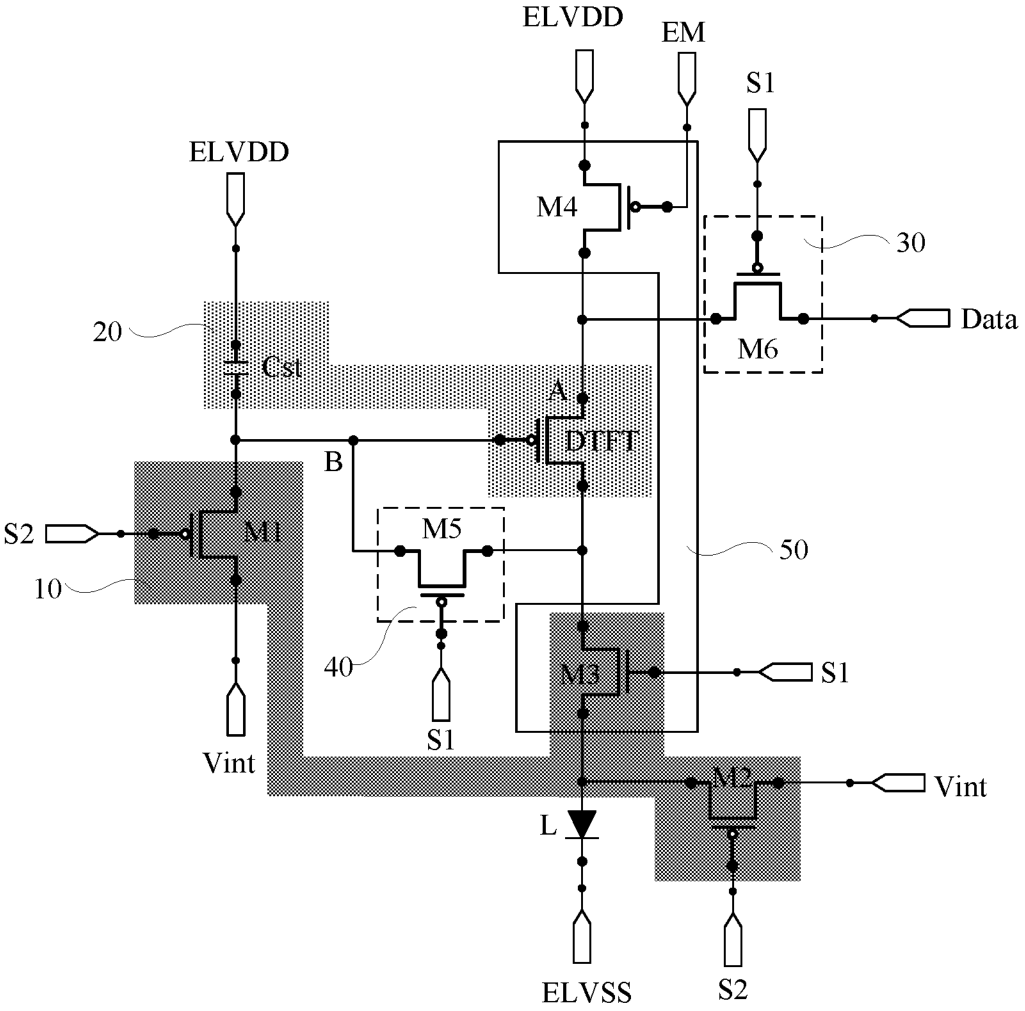
FIG. 7 is a schematic diagram of another arrangement of the reset sub-circuit in FIG. 2.

Specifically, as shown in FIG. 7, in the case where the reset sub-circuit 10 is connected to the anode of the light emitting device L, the reset sub-circuit 10 is further connected to the first scan signal terminal S1 and the second scan signal terminal S2. In this case, the reset sub-circuit 10 includes a first transistor M1, a second transistor M2, and a third transistor M3.

Wherein, a gate electrode of the first transistor M1 is connected to the second scan signal terminal S2, a first electrode of the first transistor M1 is connected to the gate electrode of the DTFT, and a second electrode of the first transistor M1 is connected to the initial voltage terminal Vint.

A gate electrode of the second transistor M2 is connected to the second scan signal terminal S2, a first electrode of the second transistor M2 is connected to the anode of the light emitting device L, and a second electrode of the second transistor M2 is connected to the initial voltage terminal Vint.

A gate electrode of the third transistor M3 is connected to the first scan signal terminal S1, a first electrode of the third transistor M3 is connected to the second electrode of the DTFT, and a second electrode of the third transistor M3 is connected to the anode of the light emitting device L.

On this basis, in the case where a part of the reset sub-circuit 10 is reused as at least a part of the light emission control sub-circuit 50, the light emission control sub-circuit 50 is further connected to the first scan signal terminal S1. In this case, the light emission control sub-circuit 50 includes the third transistor M3 described above. Therefore, the reset sub-circuit 10 and the light emission control sub-circuit 50 share the third transistor M3.

In addition, the light emission control sub-circuit 50 further includes a fourth transistor M4. A gate electrode of the fourth transistor M4 is connected to the light emission control signal terminal EM, a first electrode of the fourth transistor M4 is connected to the first voltage terminal ELVDD, and a second electrode of the fourth transistor M4 is connected to the first electrode of the DTFT.

In addition, the compensation sub-circuit 40 is connected to the first scan signal terminal S1. The compensation sub-circuit 40 includes a fifth transistor M5. A gate electrode of the fifth transistor M5 is connected to the first scan signal terminal S1, a first electrode of the fifth transistor M5 is connected to the second electrode of the DTFT, and a second electrode of the fifth transistor M5 is connected to the gate electrode of the DTFT.

The write sub-circuit 30 includes a sixth transistor M6, a gate electrode of the sixth transistor M6 is connected to the first scan signal terminal S1, a first electrode of the sixth transistor M6 is connected to the data voltage terminal Data, and a second electrode of the sixth transistor M6 is connected to the first electrode of the DTFT.

It should be noted that in the structure shown in FIG. 7, the third transistor M3 is an N-type transistor and the other transistors are P-type transistors. Alternatively, the third transistor M3 may be a P-type transistor and the other transistors are N-type transistors. In addition, each of the above transistors may be an enhancement transistor or a depletion transistor.

Below, the operation of the pixel circuit shown in FIG. 7 in an image frame will be described in detail with reference to the timing diagrams of the respective signal terminals shown in FIGS. 4*a*, 5*a* and 6*a*. In the following embodiment, the third transistor M3 is an N-type transistor, the other transistors are P-type transistors, and each of the transistors is an enhancement transistor, as an example.

Specifically, in the reset stage P1 of an image frame, as shown in FIG. 4*a*, S2=0, S1=1, EM=1, Data=0.

Figure 8:
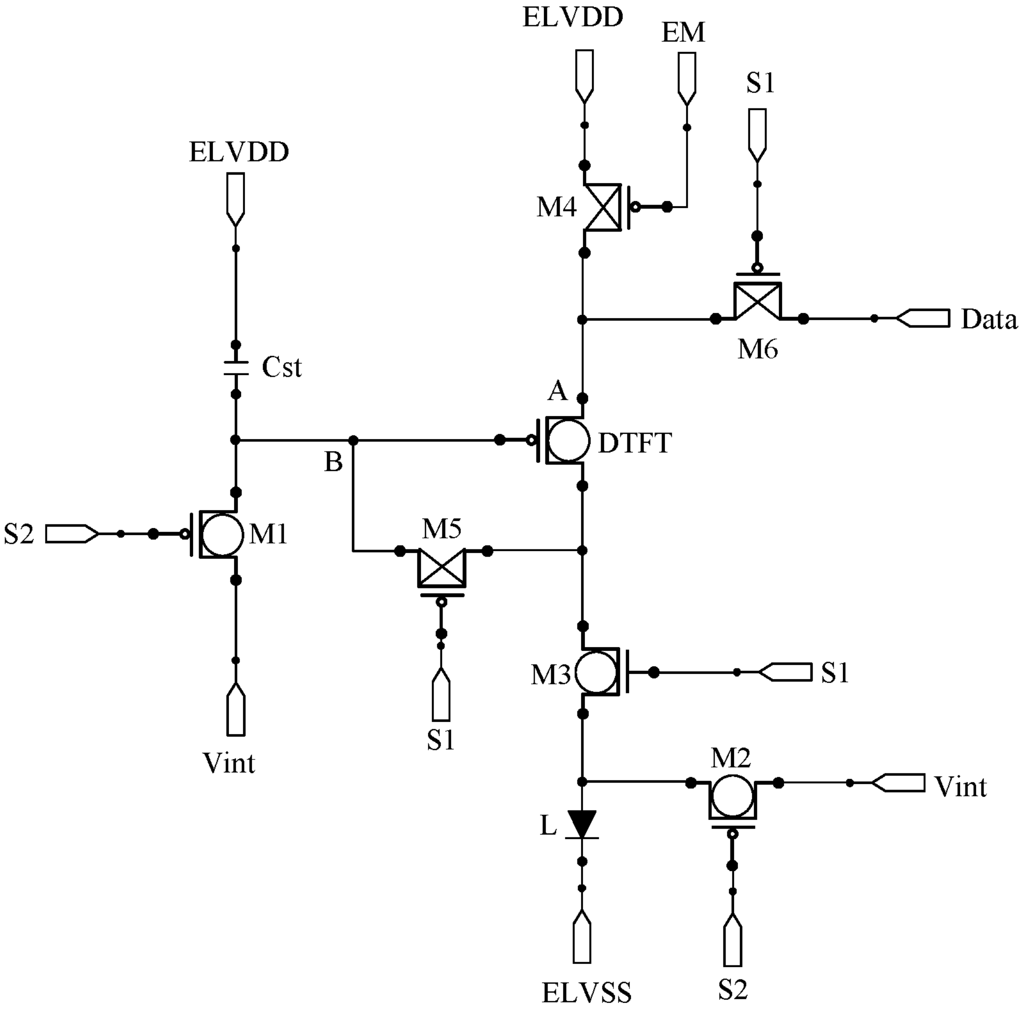
FIG. 8 shows on/off conditions of the various transistors in the pixel circuit of FIG. 7 in the reset stage of FIG. 4*a;*

In this case, as shown in FIG. 8, under the control a low level output from the second scan signal terminal S2, the first transistor M1 and the second transistor M2 are turned on. An initial voltage of the initial voltage terminal Vint is transmitted to the gate electrode of the DTFT through the first transistor M1 and to the anode of the light emitting device L through the second transistor M2, to reset the gate electrode of the DTFT and the anode of the light emitting device L, respectively.

In addition, under the control of a high level output from the first scan signal terminal S1, the third transistor M3 is turned on, the initial voltage of the initial voltage terminal Vint is transmitted to the drain electrode (i.e., the second electrode) of the DTFT through the second transistor M2 and the third transistor M3, and the source electrode (i.e., the first electrode) of DTFT is in a float state in the reset stage P1. In this case, the gate voltage of the DTFT is the same as the drain voltage, i.e., Vg=Vd=Vint. As can be known from the operation in the reset stage P1 of the structure shown in FIG. 3, when the source voltage of the DTFT is $Vs=V_A=Vint-Vth$, as described above, the DTFT is in the OFF-Bias state. In this way, after the pixel circuits of the various sub-pixels are subjected to the reset stage P1, all the DTFTs in the sub-pixels are in the same OFF-Bias state.

In addition, the fourth transistor M4, the fifth transistor M5, and the sixth transistor M6 are turned off.

In the write compensation stage P2 of an image frame, S2=1, S1=0, EM=1, Data=Vdata, as shown in FIG. 5*a.*

Figure 9:
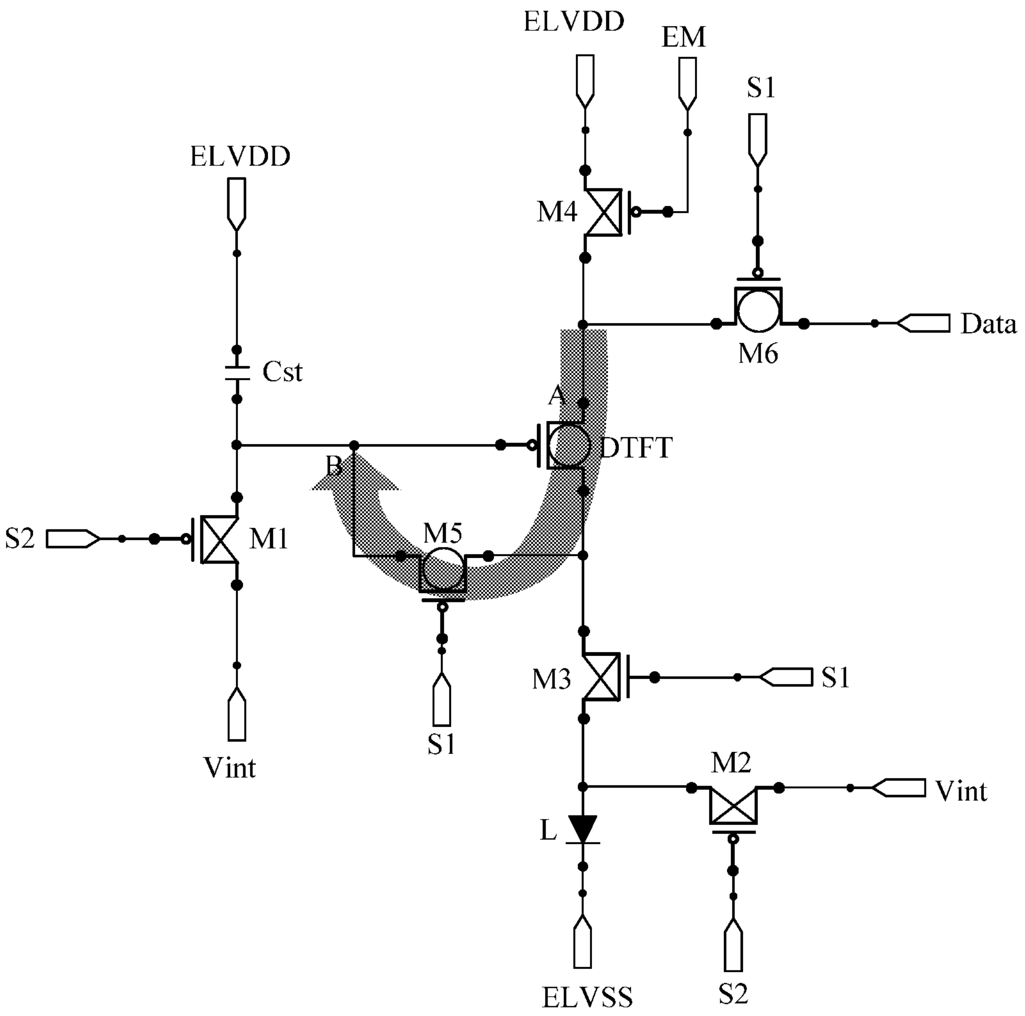
FIG. 9 shows on/off conditions of the various transistors in the pixel circuit of FIG. 7 in a writing compensation stage of FIG. 5*a;*

In this case, as shown in FIG. 9, under the control of the first scan signal terminal S1, the fifth transistor M5 and the sixth transistor M6 are turned on, thereby writing the data voltage Vdata output from the data voltage terminal Data to the source electrode of the DTFT through the sixth transistor M6. At that point, the source voltage Vs of the DTFT is $Vs=V_A=Vdata$, thus realizing the writing of the data voltage.

In addition, the fifth transistor M5 causes the gate voltage Vg of the DTFT to be the same as the drain voltage Vd, i.e., Vg=Vd. Therefore, the DTFT is in a saturated state.

In this case, the data voltage Vdata at the data voltage terminal Data charges the gate electrode (i.e., point B) of the DTFT through the sixth transistor M6, the DTFT and the fifth transistor M5, until the voltage at point B reaches Vdata+Vth. In this way, the threshold voltage Vth of the DTFT is locked to the gate electrode of the DTFT, thereby realizing compensation of the threshold voltage Vth of the DTFT.

In addition, the first transistor M1, the second transistor M2, the third transistor M3, and the fourth transistor M4 are in the OFF state.

In the light emitting stage P3 of an image frame, S2=1, S1=1, EM=0, Data=0, as shown in FIG. 6*a.*

Figure 10:
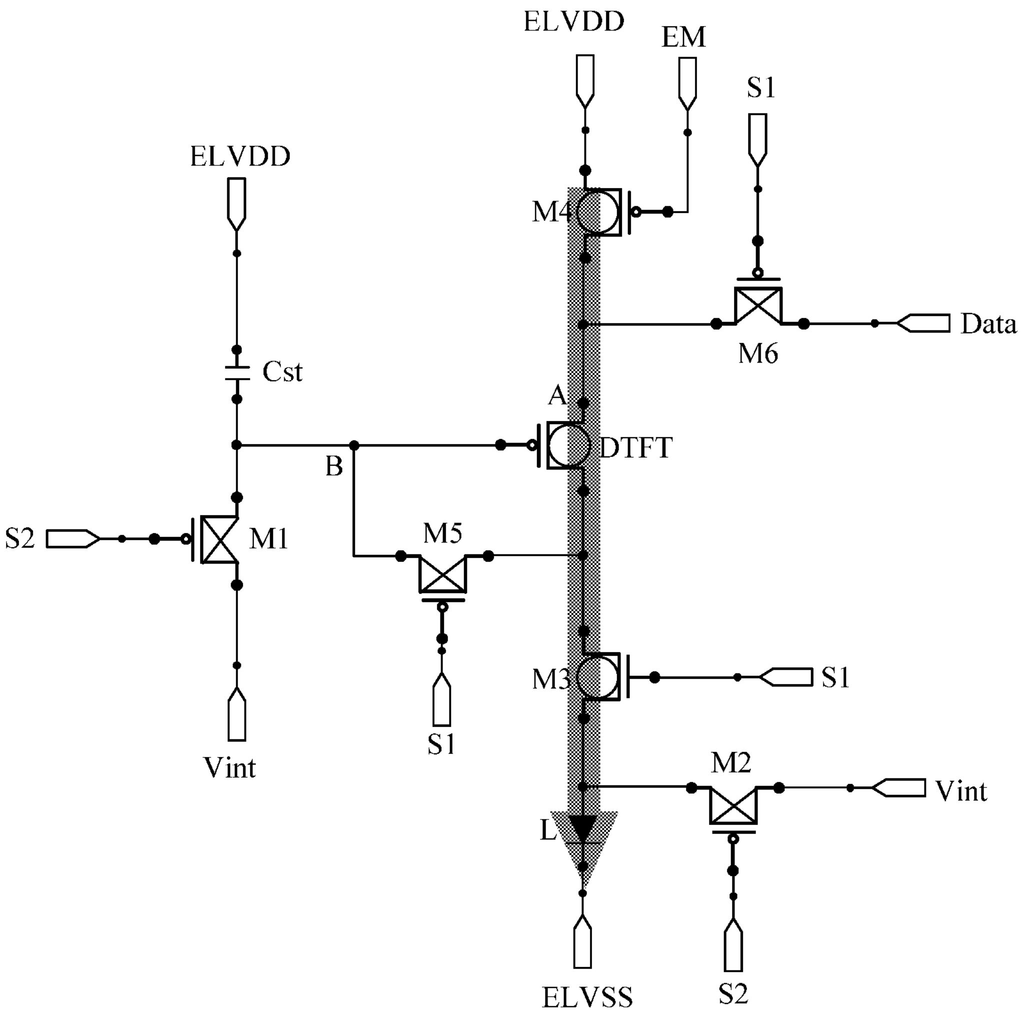
FIG. 10 shows on/off conditions of the various transistors in the pixel circuit of FIG. 7 in a light emitting stage of FIG. 5*b*.

In this case, as shown in FIG. 10, the light emission control signal terminal EM outputs a low level, and the third transistor M3 and the fourth transistor M4 are turned on. At this time, the voltage $V_A$ at point A is $V_A=ELVDD$. Under the action of the storage capacitor Cst, the voltage at point B remains $V_B=Vdata+Vth$. At this time, the gate-source voltage Vgs of the DTFT is $Vgs=Vg-Vs=V_B-V_A=(Vdata+Vth)-ELVDD=Vdata+Vth-ELVDD<Vth$, and Vth is negative. Therefore, the DTFT is turned on.

In addition, the first transistor M1, the second transistor M2, the fifth transistor M5, and the sixth transistor M6 are in the OFF state.

On this basis, the driving current $I_{OLED}$ flowing through the light emitting device L is:

$$I_{OLED}=K/2\times(Vgs-Vth)^2=K/2\times(Vdata+Vth-ELVDD-Vth)^2=K/2\times(Vdata-ELVDD)^2 \quad (1)$$

From the above formula (1), it can be seen that the driving current $I_{OLED}$ for driving the light emitting device L to emit light is independent of the threshold voltage Vth of the DTFT, thereby eliminating the influence of the threshold voltage Vth of the DTFT on the light emitting brightness of the light emitting device L, and improving the uniformity of the brightness of the light emitting device L.

It should be noted that the above is described with an example in which the third transistor M3 is an N-type transistor and the other transistors are P-type transistors. If the third transistor M3 is a P-type transistor and the other transistors are N-type transistors, the control process is similar, but some control signals need to be inverted.

An embodiment of the present disclosure provides a display device including any one of the pixel circuits described above. The pixel circuit in the display device has the same structure and beneficial effect as the pixel circuits provided in the previous embodiments, and will not be described herein.

It should be noted that the display device provided by the embodiment of the present disclosure may be a display device including an LED display or an OLED display with current-driven light emitting devices. The display device can be a television, a mobile phone, a tablet computer, etc.

Figure 11:
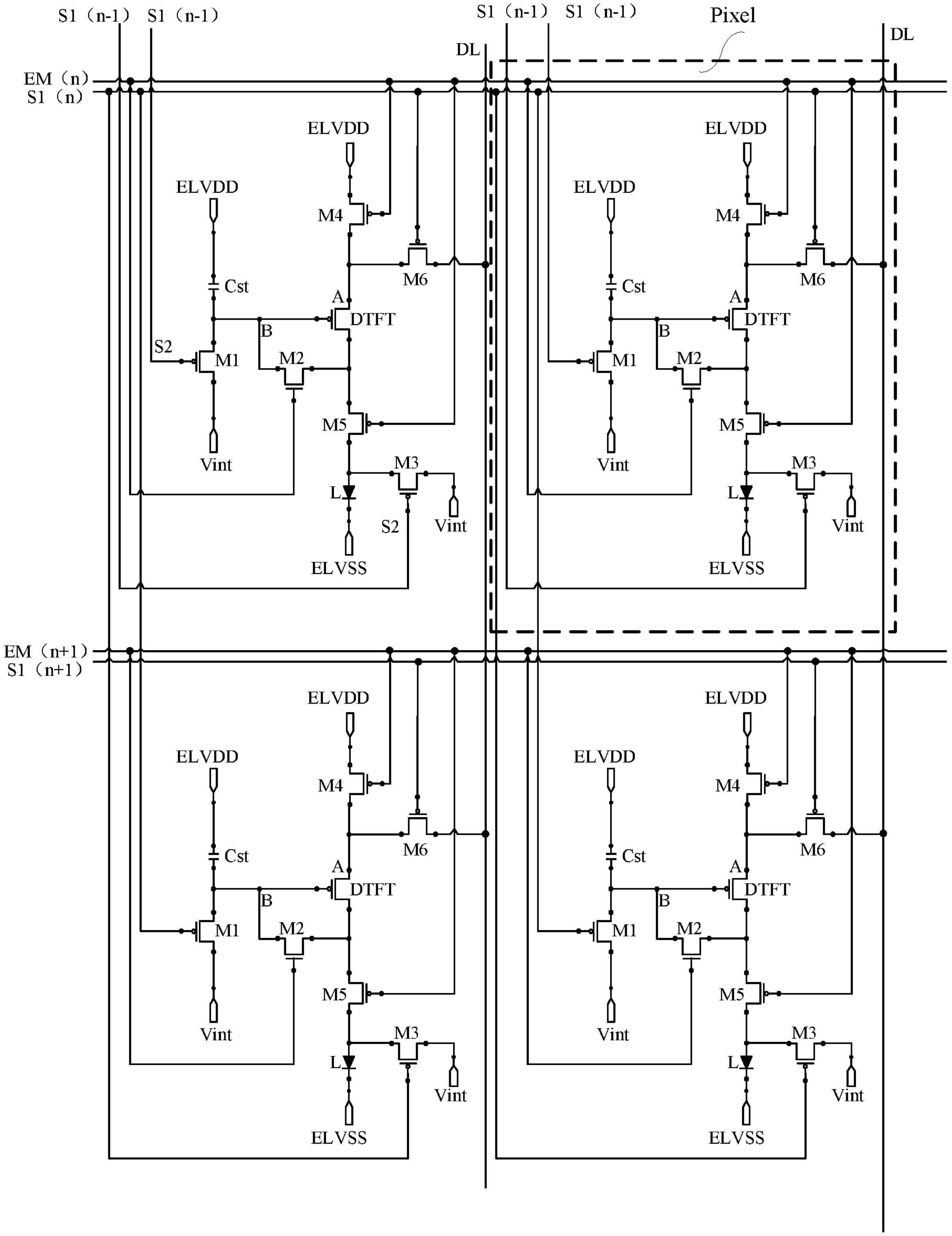
FIG. 11 is a partial structural diagram of a display panel in a display device according to an embodiment of the present disclosure.

On this basis, the display device includes a display panel with sub-pixels arranged in a matrix as shown in FIG. 11, and the pixel circuits are arranged in the sub-pixels.

In this case, with the pixel circuit shown in FIG. 3 as an example, except the first row of sub-pixels, the second scan signal terminals S2 of the pixel circuits in the next row of (nth row) sub-pixel Pixel are connected to the first scan signal terminals S1 of the pixel circuits in the previous row ((n−1)th row) of sub-pixels, where n≥1 and n is a positive integer. In this way, the signal terminals of adjacent two rows of sub-pixels are partially shared, so that the purpose of reducing the number of signal terminals can be achieved, resulting in a simpler wiring structure.

An embodiment of the present disclosure provides a method for driving any one of the pixel circuits described above, in an image frame, the method including the following steps.

Firstly, in the reset stage P1 shown in FIG. 4*a*, the reset sub-circuit 10 writes the initial voltage of the initial voltage terminal Vint to the gate electrode and the second electrode of the DTFT in the driving sub-circuit 20 as shown in FIG. 2, the first electrode of the DTFT being in a float state in the reset stage P1.

Specifically, as shown in FIG. 4*a*, in this reset stage P1, a low level is input to the second scan signal terminal S2, and a high level is input to the first scan signal terminal S1 and the light emission control signal terminal EM.

In this situation, if the structure of the reset sub-circuit 10 is shown in FIG. 3, and all the other transistors except the second transistor M2 are P-type transistors, in the above reset stage P1, the control method includes the following steps.

As shown in FIG. 4*b*, under the control of the second scan signal terminal S2, the first transistor M1 is turned on. The voltage of the initial voltage terminal Vint is written to the gate electrode of the DTFT through the first transistor M1.

In addition, under the control of the light emission control signal terminal EM, the second transistor M2 is turned on, the gate electrode of the DTFT is electrically connected to the drain electrode (i.e., the second electrode) of the DTFT, and the source electrode (i.e., the first electrode) of the DTFT is in a float state in the reset stage P1.

Alternatively, for example, if the structure of the reset sub-circuit 10 is shown in FIG. 7 and all the transistors except the third transistor M3 are P-type transistors, in the above reset stage P1, the control method includes the following steps.

As shown in FIG. 8, under the control of the second scan signal terminal S2, the first transistor M1 and the second transistor M2 are turned on. Under the control of the first scan signal terminal S1, the third transistor M3 is turned on.

The initial voltage of the initial voltage terminal Vint is written to the gate electrode of the DTFT through the first transistor M1.

The initial voltage of the initial voltage terminal Vint is written to the anode of the light emitting device L through the second transistor M2.

The initial voltage of the initial voltage terminal Vint is written to the drain electrode (i.e., the second electrode) of the DTFT through the second transistor M2 and the third transistor M3, and the source electrode (i.e., the first electrode) of the DTFT is in a float state during the reset stage P1. The specific reset process has been described above and will not be repeated herein.

Next, in the write compensation stage P2, the write sub-circuit 30 writes the data voltage Vdata of the data voltage terminal Data to the driving sub-circuit 20 under the control of the first scan signal terminal S1. The compensation sub-circuit 40 compensates the threshold voltage Vth of DTFT in the driving sub-circuit 20.

Wherein, as shown in FIG. 5*a*, in the above-mentioned write compensation stage P2, a high level is input to the second scan signal terminal S2 and the light emission control signal terminal EM, and a low level is input to the first scan signal terminal S1; a data signal Vdata is input to the data signal terminal Data. The specific compensation process has been described above and will not be repeated herein.

Next, in the light emitting stage P3, a driving current $I_{OLED}$ is generated by the drive sub-circuit 20 under the action of the first voltage terminal ELVDD, the second voltage terminal ELVSS, and the data voltage Vdata written to the driving sub-circuit 20.

In addition, the light emission control sub-circuit 50 transmits the driving current $I_{OLED}$ to the light emitting device L under the control of the light emission control signal terminal EM. The light emitting device L emits light according to the driving current $I_{OLED}$.

Wherein, as shown in FIG. 6*a*, in the above-mentioned light emitting stage P3, a high level is input to the second scan signal terminal 2 and the first scan signal terminal S1 and a low level is input to the light-emitting control signal terminal EM. The specific light emitting process has been described above, and will not be repeated herein.

It should be understood by those of ordinary skill in the art that all or part of the steps for carrying out the method in the above embodiments can be completed by hardware or a program instructing the related hardware, wherein the program can be stored in a computer readable storage medium. The program when executed can carry out the steps of the embodiments of the above methods. The above storage medium include various media capable of storing program codes such as ROM, RAM, magnetic disk or optical disk.

The disclosed above are only several specific embodiments of the present disclosure, however, the present disclosure is not limited to this. Any variation or replacement easily conceivable by those skilled in the art within the technical scope disclosed in the present disclosure shall fall within the protection scope of the present disclosure. Therefore, the protection scope of the present disclosure shall be determined by the terms of the claims.

What is claimed is:

1. A pixel circuit, including:

a light emitting device;

a driving sub-circuit configured to drive the light emitting device, the driving sub-circuit including a driving transistor configured to generate a driving current flowing through the light emitting device so that the light emitting device emits light;

a reset sub-circuit configured to reset a voltage between a gate electrode and a second electrode of the driving transistor;

a light emission control sub-circuit configured to transmit the driving current to the light emitting device; and a compensation sub-circuit configured to compensate a threshold voltage of the driving transistor;

wherein:

a part of the reset sub-circuit is reused as at least a part of the light emission control sub-circuit;

the reset sub-circuit comprises a first transistor, a second transistor and a third transistor, a gate electrode of the first transistor is directly connected to a second scan signal terminal, a first electrode of the first transistor is directly connected to the gate electrode of the driving transistor, and a second electrode of the first transistor is directly connected to an initial voltage terminal;

a gate electrode of the second transistor is directly connected to the second scan signal terminal, a first electrode of the second transistor is directly connected to an anode of the light emitting device, and a second electrode of the second transistor is directly connected to the initial voltage terminal;

a gate electrode of the third transistor is directly connected to a first scan signal terminal, a first electrode of the third transistor is directly connected to the second electrode of the driving transistor, and a second electrode of the third transistor is directly connected to the anode of the light emitting device;

the light emission control sub-circuit comprises the third transistor and a fourth transistor;

a gate electrode of the fourth transistor is directly connected to a light emission control signal terminal, a first electrode of the fourth transistor is directly connected to a first voltage terminal, and a second electrode of the fourth transistor is directly connected to a first electrode of the driving transistor; and the compensation sub-circuit includes a fifth transistor;

a gate electrode of the fifth transistor is directly connected to the first scan signal terminal, a first electrode of the fifth transistor is directly connected to the second electrode of the driving transistor, and a second electrode of the fifth transistor is directly connected to the gate electrode of the driving transistor.

2. The pixel circuit according to claim 1, wherein the first transistor and the second transistor are P-type transistors, and the third transistor is a N-type transistor.

3. The pixel circuit according to claim 1, wherein the fourth transistor is a P-type transistor.

4. The pixel circuit according to claim 1, wherein the fifth transistor is a P-type transistor.

5. The pixel circuit according to claim 1, wherein the reset sub-circuit is configured to write an initial voltage of the initial voltage terminal to the light emitting device.

6. The pixel circuit according to claim 1, wherein the reset sub-circuit is connected to an initial voltage terminal and the driving sub-circuit.

7. The pixel circuit according to claim 6, wherein the reset sub-circuit is configured to write an initial voltage of the initial voltage terminal to the gate electrode and the second electrode of the driving transistor of the driving sub-circuit.

8. The pixel circuit according to claim 7, wherein a first electrode of the driving sub-circuit is configured to be in a float state during a process in which the reset sub-circuit resets the voltage between the gate electrode and the second electrode of the driving transistor.

9. The pixel circuit according to claim 1, further including:

a write sub-circuit configured to write a data voltage from a data voltage terminal to the driving sub-circuit under a control of the first scan signal terminal.

10. The pixel circuit according to claim 9, wherein the write sub-circuit includes a sixth transistor, a gate electrode of the sixth transistor is directly connected to the first scan signal terminal, a first electrode of the sixth transistor is directly connected to the data voltage terminal, and a second electrode of the sixth transistor is directly connected to the first electrode of the driving transistor.

11. The pixel circuit according to claim 10, wherein the sixth transistor is a P-type transistor.

12. The pixel circuit according to claim 1, wherein the driving sub-circuit further includes a storage capacitor;

one end of the storage capacitor is connected to a first voltage terminal and the other end of the storage capacitor is connected to the gate electrode of the driving transistor.

13. A display device, including pixel circuit of claim 1.

14. The display device according to claim 13, wherein the display device includes a display panel on which sub-pixels arranged in a matrix are disposed, the pixel circuits being arranged in the sub-pixels;

except a first row of the sub-pixels, second scan signal terminals of the pixel circuits in a next row of sub-pixels are electronically connected to first scan signal terminals of the pixel circuits in a previous row of sub-pixels.

15. A method for driving the pixel circuit according to claim 10, comprising:

resetting the first electrode of the driving transistor, and writing, by the reset sub-circuit, an initial voltage of the initial voltage terminal to the gate electrode;

writing, by a writing sub-circuit, a data voltage of a data voltage terminal to the driving sub-circuit according to a control signal provided by the first scan signal terminal;

generating, by the driving sub-circuit, the driving current according to the first voltage terminal, a second voltage terminal, and a data voltage written to the driving sub-circuit; and emitting light by the light emitting device according to the driving current.

16. The method according to claim 15, wherein resetting the first electrode of the driving transistor comprises setting the first electrode of the driving transistor to a float state.

17. The method according to claim 15, further including:

compensating, by a compensation sub-circuit, a threshold voltage of the driving transistor in the driving sub-circuit.

* * * * *